(12) United States Patent
Asadi et al.

(10) Patent No.: US 10,824,655 B2
(45) Date of Patent: Nov. 3, 2020

(54) DATA MODELS FOR GEO-ENRICHED DATA

(71) Applicant: SAP SE, Walldorf (DE)

(72) Inventors: Mohsen Asadi, Vancouver (CA);
Lyndon Hiew, Richmond (CA);
Christopher Tam, Vancouver (CA);
Sae-Won Om, Vancouver (CA)

(73) Assignee: SAP SE, Walldorf (DE)

( * ) Notice: Subject to any disclaimer, the term of this patent is extended or adjusted under 35 U.S.C. 154(b) by 879 days.

(21) Appl. No.: 15/394,758

(22) Filed: Dec. 29, 2016

(65) Prior Publication Data

US 2018/0189321 A1 Jul. 5, 2018

(51) Int. Cl.
| | | |
|---|---|---|
| *G06F 16/29* | (2019.01) | |
| *G06F 16/9537* | (2019.01) | |
| *G06F 16/958* | (2019.01) | |
| *G06F 16/2458* | (2019.01) | |
| *G06F 16/387* | (2019.01) | |

(Continued)

(52) U.S. Cl.
CPC ....... *G06F 16/29* (2019.01); *G01N 2001/021* (2013.01); *G06F 16/211* (2019.01); *G06F 16/2471* (2019.01); *G06F 16/387* (2019.01); *G06F 16/487* (2019.01); *G06F 16/587* (2019.01); *G06F 16/687* (2019.01); *G06F 16/787* (2019.01); *G06F 16/909* (2019.01); *G06F 16/9537* (2019.01); *G06F 16/972* (2019.01); *H04L 63/0281* (2013.01); *H04L 67/28* (2013.01); *H04L 67/2814* (2013.01)

(58) Field of Classification Search
CPC .... G06F 16/29; G06F 16/9537; G06F 16/387; G06F 16/487; G06F 16/587; G06F 16/687; G06F 16/787; G06F 16/909; G06F 17/30241; G06F 16/211; G06F 16/2471; G06F 16/972; G01N 2001/021; H04L 63/0281; H04L 67/28; H04L 67/2814

USPC .......... 707/E17.018; 701/532; 709/217, 219; 726/12

See application file for complete search history.

(56) References Cited

U.S. PATENT DOCUMENTS

| | | | |
|---|---|---|---|
| 7,010,426 B1 * | 3/2006 | Van Watermulen | ........................ G06F 9/5055 701/532 |
| 7,949,691 B1 * | 5/2011 | Franciscus de Heer | ..................... G06Q 30/0603 707/791 |

(Continued)

OTHER PUBLICATIONS

Sayar et al.; "OGC Compatible Geographical Information Systems Web Services"; Indiana University Computer Science Department, Bloomington (Year: 2005).*

(Continued)

*Primary Examiner* — Dennis Truong
(74) *Attorney, Agent, or Firm* — Fountainhead Law Group P.C.

(57) ABSTRACT

Some embodiments provide a non-transitory machine-readable medium that stores a program. The program receives from a data modeling system a data model definition of a data model. The program further generates a query for geo-enriched data from the data model based on the data model definition. The program also sends the query to a proxy system for the proxy system to forward the query to a geo-enriched data system. The program further receives a set of geo-enriched data from the geo-enriched data system via the proxy system.

20 Claims, 8 Drawing Sheets

(51) Int. Cl.
*G06F 16/909* (2019.01)
*G06F 16/787* (2019.01)
*G06F 16/587* (2019.01)
*G06F 16/487* (2019.01)
*G06F 16/687* (2019.01)
*H04L 29/08* (2006.01)
*H04L 29/06* (2006.01)
*G01N 1/02* (2006.01)
*G06F 16/21* (2019.01)

(56) References Cited

U.S. PATENT DOCUMENTS

| | | | | |
|---|---|---|---|---|
| 9,514,459 | B1* | 12/2016 | Doshi | G06Q 20/383 |
| 2004/0030706 | A1* | 2/2004 | Evans | H04L 69/329 |
| 2005/0097108 | A1* | 5/2005 | Wang | G06F 16/284 |
| 2005/0165725 | A1* | 7/2005 | Rugland | G06F 16/29 |
| 2007/0088689 | A1* | 4/2007 | Cras | G06F 16/283 |
| 2007/0136443 | A1* | 6/2007 | Sah | G06F 16/9535 |
| | | | | 709/219 |
| 2007/0165625 | A1* | 7/2007 | Eisner | G06F 9/546 |
| | | | | 370/389 |
| 2008/0077983 | A1* | 3/2008 | Meyer | G06F 12/1466 |
| | | | | 726/12 |
| 2008/0301643 | A1* | 12/2008 | Appleton | G06Q 30/02 |
| | | | | 717/124 |
| 2009/0063453 | A1* | 3/2009 | Adler | G06F 16/2471 |
| 2010/0030740 | A1* | 2/2010 | Higgins | G06Q 30/02 |
| | | | | 715/762 |
| 2010/0125623 | A1* | 5/2010 | Rice | G06F 16/958 |
| | | | | 709/202 |
| 2010/0145947 | A1* | 6/2010 | Kolman | H04L 67/18 |
| | | | | 707/736 |
| 2011/0213634 | A1* | 9/2011 | Karakey | G06Q 10/063112 |
| | | | | 705/7.14 |
| 2011/0231454 | A1* | 9/2011 | Mack | G06F 16/2228 |
| | | | | 707/803 |
| 2013/0332877 | A1* | 12/2013 | Florance | G06Q 10/10 |
| | | | | 715/781 |
| 2015/0052258 | A1* | 2/2015 | Johnson | H04L 67/141 |
| | | | | 709/228 |
| 2015/0256589 | A1* | 9/2015 | Newburn | H04L 67/28 |
| | | | | 709/203 |
| 2016/0065650 | A1* | 3/2016 | Pahwa | G06F 16/9535 |
| | | | | 709/219 |
| 2016/0088023 | A1* | 3/2016 | Handa | H04L 67/2823 |
| | | | | 726/1 |
| 2017/0193016 | A1* | 7/2017 | Kulkarni | G06F 16/288 |
| 2017/0295236 | A1* | 10/2017 | Kulkarni | H04L 67/32 |
| 2018/0189321 | A1* | 7/2018 | Asadi | G06F 16/29 |

OTHER PUBLICATIONS

Brauner; "Formalization for Geooperators—Geoprocessing in Spatial Data Infrastructure";Jan. 19, 2015 (Year: 2015).*

* cited by examiner

| Path | System |
|------|--------|
| /Sys_a | System 125a |
| /Sys_b | System 125b |
| ••• | ••• |
| /Sys_n | System 125n |

Mappings 400

DATA MODELS FOR GEO-ENRICHED DATA

BACKGROUND

Modern computing systems generate, manage, and/or store an increasingly large amount of data. Much of data may include data that describes a location (e.g., an address, a city, a state, a country, a postal zip code, etc.). Some computing systems may perform geocoding operations on such data to determine a location on the surface of the Earth associated with the described location. Geocoded data may useful in some other aspects and/or application. For example, the geocoded data may be used for mapping purposes, business intelligence, spatial analysis, etc.

SUMMARY

In some embodiments, a non-transitory machine-readable medium stores a program. The program receives from a data modeling system a data model definition of a data model. The program further generates a query for geo-enriched data from the data model based on the data model definition. The program also sends the query to a proxy system for the proxy system to forward the query to a geo-enriched data system. The program further receives a set of geo-enriched data from the geo-enriched data system via the proxy system.

In some embodiments, the program may further access a tool for creating data models provided by an application operating on the data modeling system. The program may also send information associated with the data model to the application in order for the application to create and store the data model definition on the data modeling system. The data model definition of the data model may be a first data model definition of a first data model, the query may be a first query. The geo-enriched data system may be a first geo-enriched data system, and the set of geo-enriched data may be a first set of geo-enriched data. The program may further receive from the data modeling system a second data model definition of a second data model. The program may also generate a second query for geo-enriched data from the second data model based on the second data model definition. The program may further send the second query to the proxy system for the proxy system to forward the second query to a second geo-enriched data system. The program may also receive a second set of geo-enriched data from the second geo-enriched data system via the proxy system.

In some embodiments, the program may further send the data modeling system a request for the data model definition of the data model. The data model definition may include a first view of non-spatial data stored in a first set of tables on the geo-enriched data system, a second view of spatial data stored in a second set of tables on the geo-enriched data system, and a mapping between the first view and the second view on the geo-enriched data system. The non-spatial data stored in the second set of tables on the geo-enriched data system may include location data. The spatial data stored in the second set of tables on the geo-enriched data system may include the location data that has been geo-enriched. The program may further generate a map visualization that includes the set of geo-enriched data.

In some embodiments, a method receives from a data modeling system a data model definition of a data model. The method further generates a query for geo-enriched data from the data model based on the data model definition. The method also sends the query to a proxy system for the proxy system to forward the query to a geo-enriched data system. The method further receives a set of geo-enriched data from the geo-enriched data system via the proxy system.

In some embodiments, the method may further access a tool for creating data models provided by an application operating on the data modeling system. The method may also send information associated with the data model to the application in order for the application to create and store the data model definition on the data modeling system. The data model definition of the data model may be a first data model definition of a first data model, the query may be a first query, the geo-enriched data system may be a first geo-enriched data system, and the set of geo-enriched data may be a first set of geo-enriched data. The method may further receive from the data modeling system a second data model definition of a second data model. The method may also generate a second query for geo-enriched data from the second data model based on the second data model definition. The method may further send the second query to the proxy system for the proxy system to forward the second query to a second geo-enriched data system. The method may also receive a second set of geo-enriched data from the second geo-enriched data system via the proxy system.

In some embodiments, the method may further send the data modeling system a request for the data model definition of the data model. The data model definition may include a first view of non-spatial data stored in a first set of tables on the geo-enriched data system, a second view of spatial data stored in a second set of tables on the geo-enriched data system, and a mapping between the first view and the second view on the geo-enriched data system. The non-spatial data stored in the second set of tables on the geo-enriched data system may include location data. The spatial data stored in the second set of tables on the geo-enriched data system may include the location data that has been geo-enriched. The method may further generate a map visualization that includes the set of geo-enriched data.

In some embodiments, a system includes a set of processing units and a non-transitory computer-readable medium that stores instructions. The instructions cause at least one processing unit to receive from a data modeling system a data model definition of a data model. The instructions further cause the at least one processing unit to generate a query for geo-enriched data from the data model based on the data model definition. The instructions also cause the at least one processing unit to send the query to a proxy system for the proxy system to forward the query to a geo-enriched data system. The instructions further cause the at least one processing unit to receive a set of geo-enriched data from the geo-enriched data system via the proxy system.

In some embodiments, the instructions may further cause the at least one processing unit to access a tool for creating data models provided by an application operating on the data modeling system. The instructions may also cause the at least one processing unit to send information associated with the data model to the application in order for the application to create and store the data model definition on the data modeling system. The data model definition of the data model may be a first data model definition of a first data model, the query may be a first query, the geo-enriched data system may be a first geo-enriched data system, and the set of geo-enriched data may be a first set of geo-enriched data. The instructions may further cause the at least one processing unit to receive from the data modeling system a second data model definition of a second data model. The instructions may also cause the at least one processing unit to generate a second query for geo-enriched data from the second data model based on the second data model definition. The instructions may further cause the at least one processing unit to send the second query to the proxy system for the proxy system to forward the second query to a second geo-enriched data system. The instructions may also cause the at least one processing unit to receive a second set of geo-enriched data from the second geo-enriched data system via the proxy system.

In some embodiments, the instructions may further cause the at least one processing unit to send the data modeling system a request for the data model definition of the data model. The data model definition may include a first view of non-spatial data stored in a first set of tables on the geo-enriched data system, a second view of spatial data stored in a second set of tables on the geo-enriched data system, and a mapping between the first view and the second view on the geo-enriched data system. The non-spatial data stored in the second set of tables on the geo-enriched data system may include location data. The spatial data stored in the second set of tables on the geo-enriched data system may include the location data that has been geo-enriched. The instructions may further cause the at least one processing unit to generate a map visualization that includes the set of geo-enriched data.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for creating data models that are used to access geo-enriched data in different geo-enriched data system. In some embodiments, a user of a client device may access an application operating on a data modeling system to create a data model definition for a data model. The user of the client device may send a query for geo-enriched data from a particular geo-enriched data system to a reverse proxy system, which forwards the query to the particular geo-enriched data system. The client device can receive geo-enriched data from the particular geo-enriched data system via the reverse proxy system. The client device can then use and/or process the geo-enriched data any number of different ways such as generate a map visualization that includes the geo-enriched data.

In some embodiments, a spatial visualization is a visualization that illustrates relationships among elements in a defined space. An example of a spatial visualization is a map visualization. In some embodiments, a non-spatial visualization is a visualization that does not depict relationships among elements in a defined space. Examples of non-spatial visualizations include charts, graphs, tables, etc.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data. In some embodiments, location data is data that describes a location, area, region, or combination thereof (e.g., a location, area, region, or combination thereof on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve, an area represented as an ST_polygon, etc.). Spatial operations may be performed on spatial data such as calculating the intersection of spatial data (e.g., intersection of two polygons), determining whether spatial data (e.g., a point, a line, a polygon, or any combination therefore) is contained within another spatial data (e.g., a polygon), etc.

Figure 1:
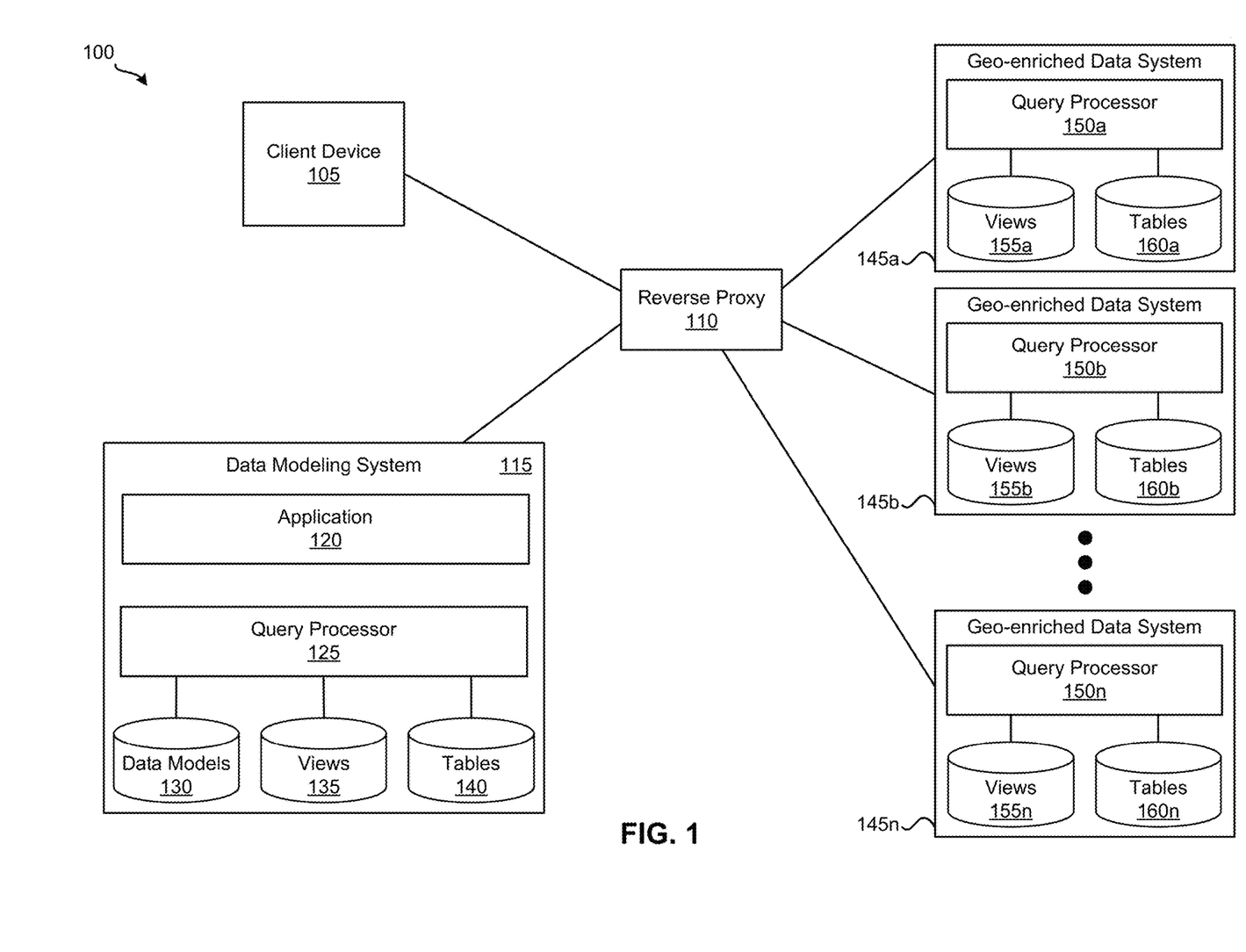
FIG. 1 illustrates a system for creating data models according to some embodiments.

FIG. 1 illustrates a system 100 for creating data models according to some embodiments. As shown, system 100 includes client device 105, reverse proxy system 110, data modeling system 115, and geo-enriched data systems 145a-n. Client device 105 may be used to facilitate the creation of data models. For instance, client device 105 may access a tool provided by application 120 operating on data modeling system 115. Using the tool, client device 105 can send application 120 a request to create a data model that includes geo-enriched data in a geo-enriched data system 145 along with information for the data model.

In some embodiments, a data model is defined as one or more views, one or more tables associated with the one or more views, and a set of mappings between the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables. In some embodiments, a data model may be defined for data stored on one system (e.g., data modeling system 115 or a geo-enriched data system 145).

Figure 2:
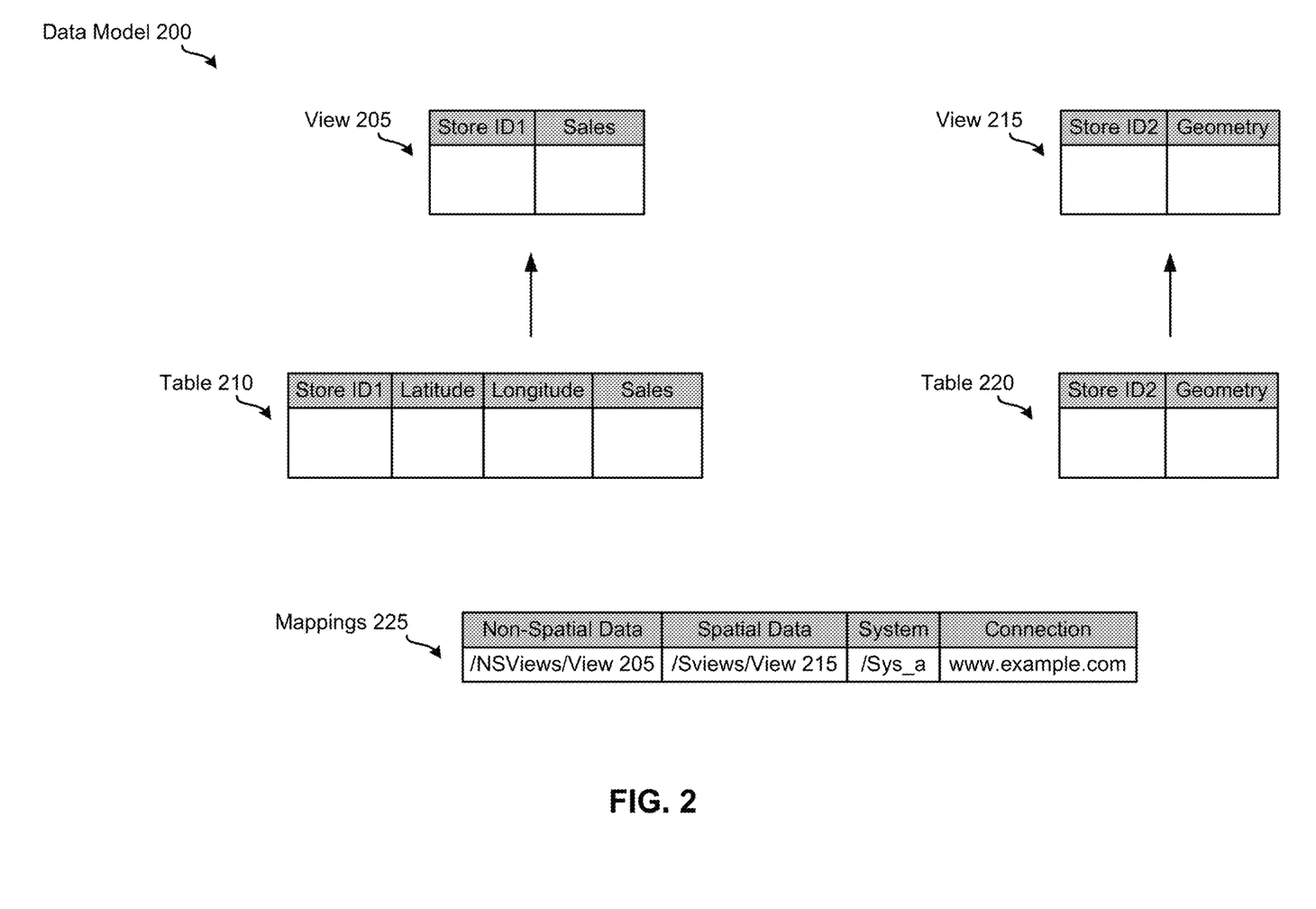
FIG. 2 illustrates an example data model according to some embodiments.

FIG. 2 illustrates an example data model 200 according to some embodiments. Specifically, data model 200 is a data model of store data stored on geo-enriched data system 145a. As shown, data model 200 includes view 205, table 210, view 215, table 220, and mappings 225. FIG. 2 illustrates that view 205 is a filter that specifies Store ID1 and Sales attributes from table 210 while view 205 is a filter that specifies Store ID2 and Geometry attributes from table 215. In this example, table 210 includes non-spatial data attributes include a Store ID1 attribute for storing a unique identifier for identifying a store, a latitude attribute for storing a latitude coordinate of a location of the store, a longitude attribute for storing a longitude coordinate of the location of the store, and a sales attribute for storing a number of sales associated with the store. Table 220 includes a spatial data attribute that includes a Geometry attribute. As such, view 205 is a view of non-spatial data and view 215 is a view of spatial data. For this example, the Store ID2 attribute in table 220 is associated with Store ID1 in table 210. That is, non-spatial data in table 210 is associated with spatial data on in table 220 based on the Store ID1 attribute in table 210 and the Store ID2 in table 220. The Geometry attribute in table 220 may be configured to store spatial data. The spatial data in this example includes a spatial point (e.g., an ST_point) that represents the location of a store on the surface of the Earth. A spatial point of a store may be generated by geocoding the corresponding values of the latitude and longitude attributes of the store in table 210.

Mappings 225 stores a set of mappings between non-spatial data specified in the data model and spatial data specified in the data model. As mentioned above, data model 200 is a data model for store data stored on geo-enriched data system 145a. View 205, table 210, view 215, and table 220 may be stored in any number of different locations on geo-enriched data system 145a. In this example, view 205 is stored in a folder named /NSViews while view 215 is stored in a folder named /SViews. Accordingly, mappings 225 includes a mapping between view 205 and view 215 that includes references to the respective example locations in which views 205 and view 215 are stored. In addition, geo-enriched data system 145a can be accessed in this example via a Uniform Resource Locator (URL) of www.example.com/Sys_a. Thus, mappings 225 includes the hostname of geo-enriched data system 145a as a Connection attribute associated with the mapping and the path of the URL as a System attribute associated with the mapping.

Returning to FIG. 1, once the data model has been created, client device 105 may access geo-enriched data from the geo-enriched data system 145. For example, client device 105 accesses such geo-enriched data by sending data modeling system 115 a request for a data model definition of the data model. Referring to FIG. 2 as an example, client device 105 can send data modeling system 115 a request for a data model definition of data model 200. Once client device 105 receives the data model definition from data modeling system 115, client device may generate a query for data from the data model based on the data model definition. Continuing with the above example, client device 105 may generate a query for the sales and spatial points of stores from the data model defined by data model 200. Specifically, client device 105 generates a query for values of the Sales attribute in view 205 and the Geometry attribute in view 215 where the value for the Store ID1 attribute in view 205 and the value for the Store ID2 attribute in view 215 are the same. Client device 115 then uses the values of the System and Connection attributes in mappings 225 to send the query to reverse proxy system 110 using the URL www.example.com/Sys_a. In return, client device 105 receives geo-enriched data from geo-enriched data system 145 via reverse proxy system 110. Continuing with the above example, client device 105 may receive the sales and spatial point data from geo-enriched data system 145a.

Figure 3:
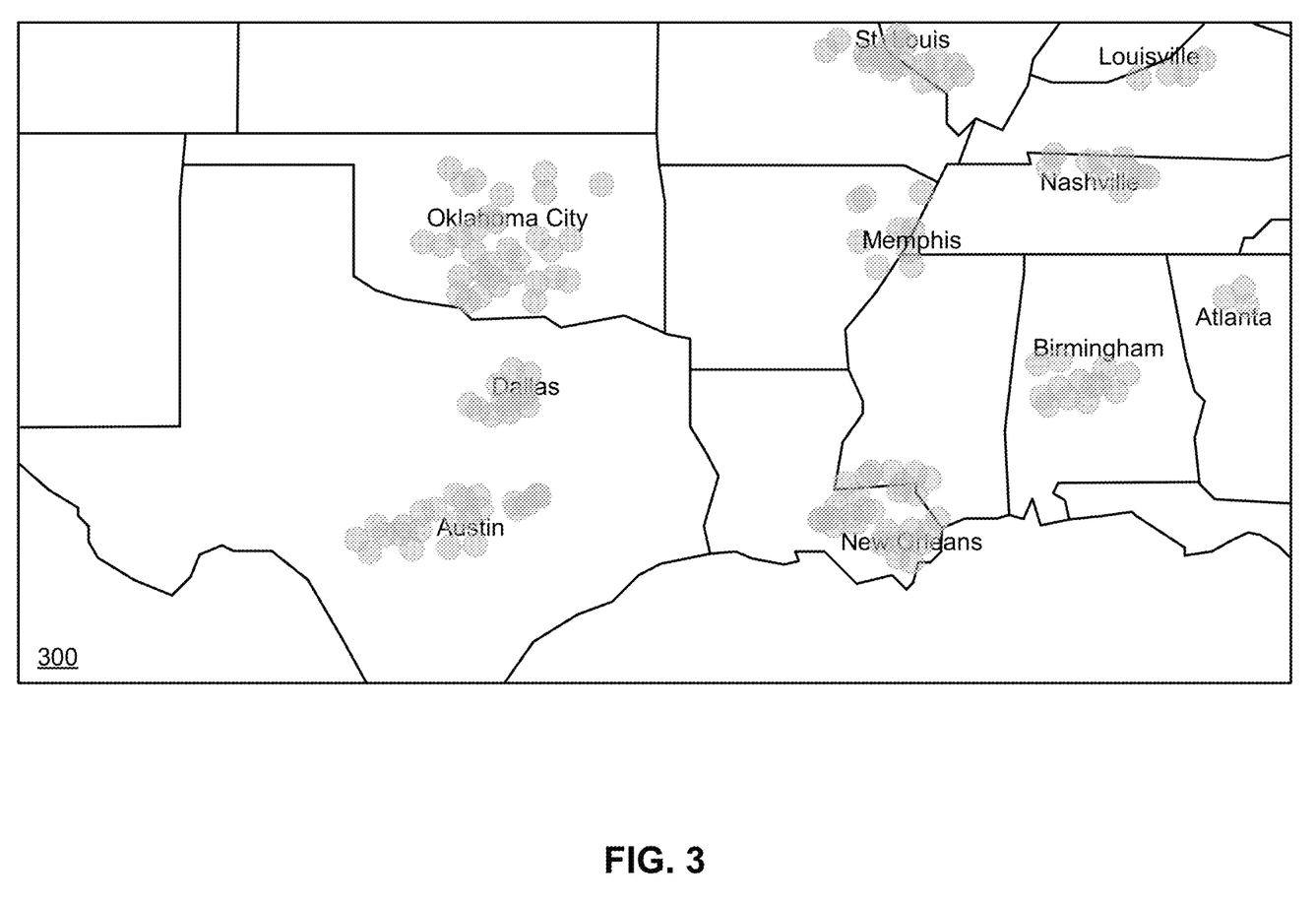
FIG. 3 illustrates an example of a map visualization according to some embodiments.

Upon receiving the geo-enriched data, client device 105 may use and/or process the geo-enriched data any number of different ways. For instance, client device 105 may generate a map visualization that includes the geo-enriched data. Continuing with the above example, client device 105 can generate a map visualization that includes the geographical locations of the stores based on spatial data from data model 200, which client device 105 received from geo-enriched data system 145a. FIG. 3 illustrates an example of a map visualization 300 according to some embodiments. In particular, map visualization 300 illustrates an example of a map visualization that includes the geographical locations of stores. As shown, map visualization 300 includes a view of a map that includes several states in the Southern United States (e.g., Texas, Oklahoma, Louisiana, Arkansas, Alabama, Tennessee, etc.). Additionally, map visualization 300 includes the geographical locations of stores, which are represented by gray circles, in the shown portion of the United States.

Reverse proxy system 110 is configured to manage queries from client device 105. In some embodiments, reverse proxy system 110 maintain mappings between URL paths and geo-enriched data systems 145a-n. When reverse proxy system 110 receives a query for data in a data model) from client device 105, reverse proxy system 110 forwards the request to one of the geo-enriched data systems 145a-n based on the mappings.

Figure 4:
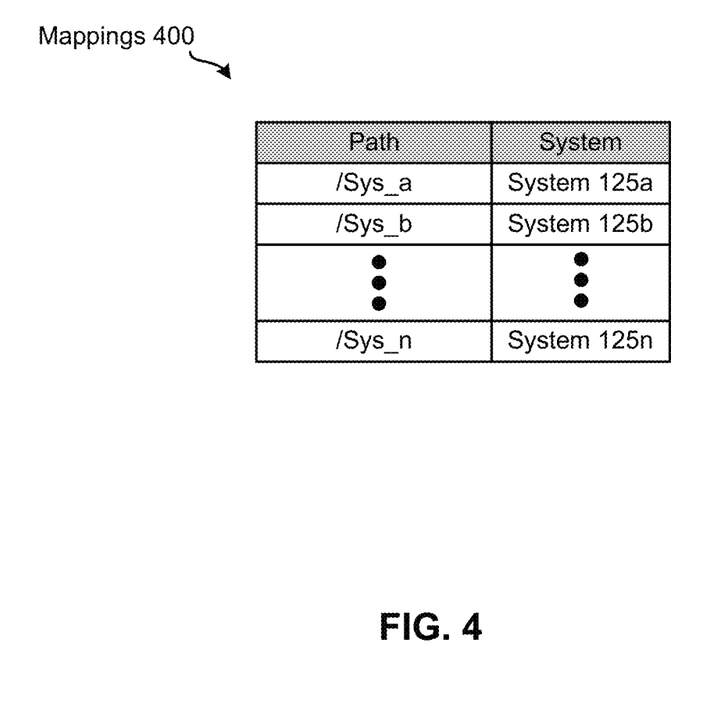
FIG. 4 illustrates an example of mappings in a reverse proxy system according to some embodiments.

FIG. 4 illustrates an example of mappings 400 in a reverse proxy system according to some embodiments. As described in the example above, geo-enriched data system 145a can be accessed via a URL of www.example.com/Sys_a. Continuing with this example, geo-enriched data system 145b can be accessed via a URL of www.example.com/Sys_b, geo-enriched data system 145c (not shown in FIG. 1) can be accessed via a URL of www.example.com/Sys_c, and so on and so forth, and geo-enriched data system 145n can be accessed via a URL of www.example.com/Sys_n. Mappings 400 illustrates mappings used in such an example. Specifically, mappings 400 includes a Path attribute for storing a path of a URL and a System attribute for storing a geo-enriched data system 145 associated with the path. In some embodiments, values of the System attribute include network identifier (e.g., an Internet Protocol (IP) address, a hostname, a Media Access Control (MAC) address, etc.) associated with the respective geo-enriched data system 145. As shown, mappings 400 a URL path of /Sys_a is associated with geo-enriched data system 145a, a URL path of /Sys_b is associated with geo-enriched data system 145b, etc., and a URL path of /Sys_n is associated with geo-enriched data system 145n. In such an example, reverse proxy system 110 receives a request from client device 105 via a URL, reverse proxy system 110 determines the path in the URL and identifies a geo-enriched data system 145 that corresponds to the path in mappings 400.

Returning to FIG. 1, after reverse proxy system 110 forwards a query to a geo-enriched data system 145, reverse proxy system 110 may receive results for the query from the geo-enriched data system. Reverse proxy system 110 then forwards the results for the query to client device 105.

Data modeling system 115 is configured to create and manage data model definitions of data models (e.g., a definition for data model 200). In some embodiments, data modeling system 115 is implemented as a cloud computing system. As shown, data modeling system 115 includes application 120, query processor 125, data models storage 130, views storage 135, and tables storage 140. Data models storage 130 may be configured to store data model definitions of data models. Views storage 135 can store views used in data model definitions (e.g., similar to views 205 and 215), and tables storage 140 can store tables of data (e.g., similar to tables 210 and 220) used for the views stored in views storage 135.

Application 120 may provide tools for client device 105 to create and manage data models. In some embodiments, application 120 allows client device 105 to access the tools through a graphical user interface (GUI) that application 120 provides to client device 105. Through the tools, application 120 can receive from client device 105 a request to create a data model of geo-enriched data in a geo-enriched data system 145 along with information for the data model. In some embodiments, the information for the data model includes views of the data model, attributes included in the view, mappings between the views, system information associated with the geo-enriched data system, and connection information associated with the geo-enriched data system. Based on the information for the data model, application 120 generates a data model definition for the data model and stores it in data models storage 130. In some cases, application 120 may receive from client device 105 a request for a data model definition for a data model. In response, application 120 accesses data models storage 130, retrieves the data model definition, and sends the data model definition to client device 105.

The examples and embodiments described above illustrate data models of geo-enriched data stored in a geo-enriched data system 145. In some embodiments, a data model can be defined for geo-enriched data stored data modeling system 115 in the same or similar manner as that described in the above examples and embodiments. In some such embodiments, query processor 125 is configured to process queries for geo-enriched data. For example, query processor 130 can receive from client device 105 a query for geo-enriched data from a data model defined for geo-enriched data stored data modeling system 115. Upon receiving such a query, query processor 130, query processor 130 accesses views and/or tables stored in views storage 135 and tables storage 140 in order to identify data specified in the query. Next, query processor 130 generates a set of result for the query based on the identified data. Then, query processor 130 sends the set of results to client device 105.

Geo-enriched data systems 145a-n are configured to manager non-spatial data and spatial data associated with the non-spatial data. As shown, each geo-enriched data system 145 includes query processor 150, views storage 155, and tables storage 160. Views storage 155 may be configured to store views (e.g., view 205, view 215, etc.) used in data model definitions. Tables storage 160 may store tables of data (e.g., table 210, table 220, etc.) used for the views stored in views storage 155.

Query processor 150 can be configured to process queries for geo-enriched data. For instance, when query processor 130 receives from client device 105 a query for geo-enriched data from a data model defined for geo-enriched data stored in the geo-enriched data system, query processor 150 accesses views and/or tables stored in views storage 155 and tables storage 160 in order to identify data specified in the query. Query processor 150 then generates a set of result for the query based on the identified data. After generating the set of results, query processor 150 sends the set of results to client device 105.

FIG. 1 illustrates a system that includes a client device. One of ordinary skill in the art will understand that the system may include any number of additional client devices that are configured to interact with data modeling system 115 and geo-enriched data systems 145a-n in the same or similar manner as that described above by reference to client device 105. Additionally, the above examples and embodiments describe the creation of one example data model of geo-enriched data stored on a geo-enriched data system and a client device querying for the geo-enriched data from the geo-enriched data system. One of ordinary skill in the art will appreciate that any number of additional and/or different data models of geo-enriched data stored on one of the geo-enriched data systems 145 may be created. In addition, the client device may query for different sets of geo-enriched data from different geo-enriched data systems 145 based on different data model definitions. The client device may also use and/or process the different set of geo-enriched data. For instance, the client device may render a map visualization that includes the different sets of geo-enriched data.

Figure 5:
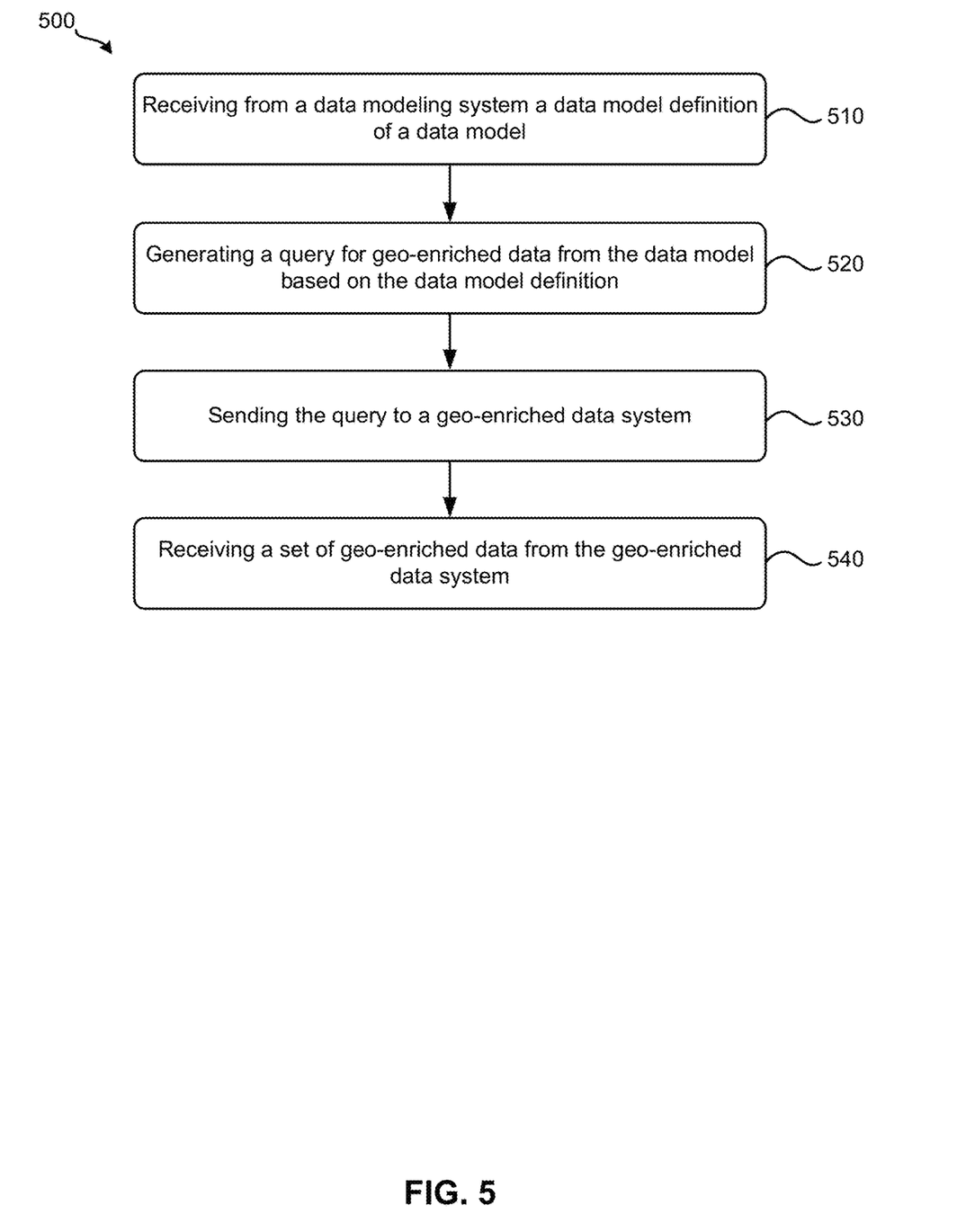
FIG. 5 illustrates a process for accessing geo-enriched data according to some embodiments.

FIG. 5 illustrates a process 500 for accessing geo-enriched data according to some embodiments. In some embodiments client device 105 performs process 500. Process 500 starts by receiving, at 510, from a data modeling system a data model definition of a data model. Referring to FIGS. 1 and 2 as an example, client device 105 performs operation 510 by receiving a data model definition for data model 200 from data modeling system 115. As mentioned above, data model 200 includes view 205 of non-spatial data and view 210 of spatial data.

Next, process 500 generates, at 520, a query for geo-enriched data from the data model based on the data model definition. Continuing with the above example, client device 105 may generate a query for the sales and spatial points of stores from data model 200. Specifically, client device 105 generates a query for values of the Sales attribute in view 205 and the Geometry attribute in view 215 where the value for the Store ID1 attribute in view 205 and the value for the Store ID2 attribute in view 215 are the same.

Process 500 then sends, at 530, the query to a geo-enriched data system. In some embodiments, client device 105 sends the query to the geo-enriched data system by sending the query to reverse proxy system 110 for reverse proxy system 110. Continuing with the above example, client device 115 may use the values of the System and Connection attributes in mappings 225 to send the query to reverse proxy system 110 using the URL www.example-.com/Sys_a.

Finally, process 500 receives, at 540, a set of geo-enriched data from the geo-enriched data system. Continuing with the example above, client device 105 receives a set of geo-enriched data that includes store sales data and spatial point data associated with the stores from geo-enriched data system 145a via reverse proxy system 110. As explained above, client device 105 may use and/or process the received geo-enriched data any number of different ways. Referring to FIG. 3 as an example, client device 105 may generate a map visualization that includes the geographical locations of the stores based on spatial data from data model 200, such as map visualization 300.

Figure 6:
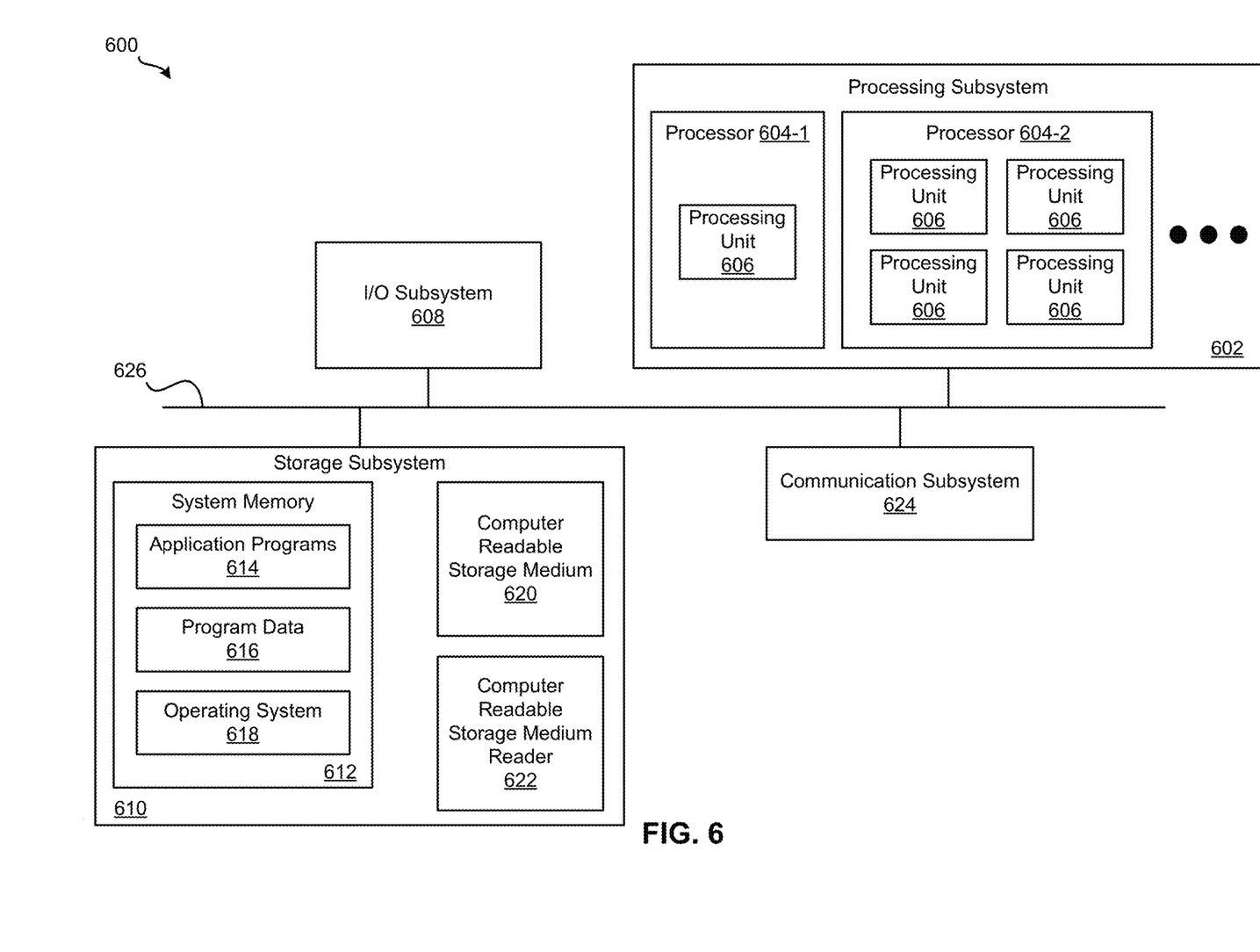
FIG. 6 illustrates an exemplary computer system for implementing various embodiments described above.

FIG. 6 illustrates an exemplary computer system 600 for implementing various embodiments described above. For example, computer system 600 may be used to implement client device 105, data modeling system 115, and geo-enriched data system 145a-n. Computer system 600 may be a desktop computer, a laptop, a server computer, or any other type of computer system or combination thereof. Computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 120), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., application 120, query processor 125, and query processors 150a-n) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
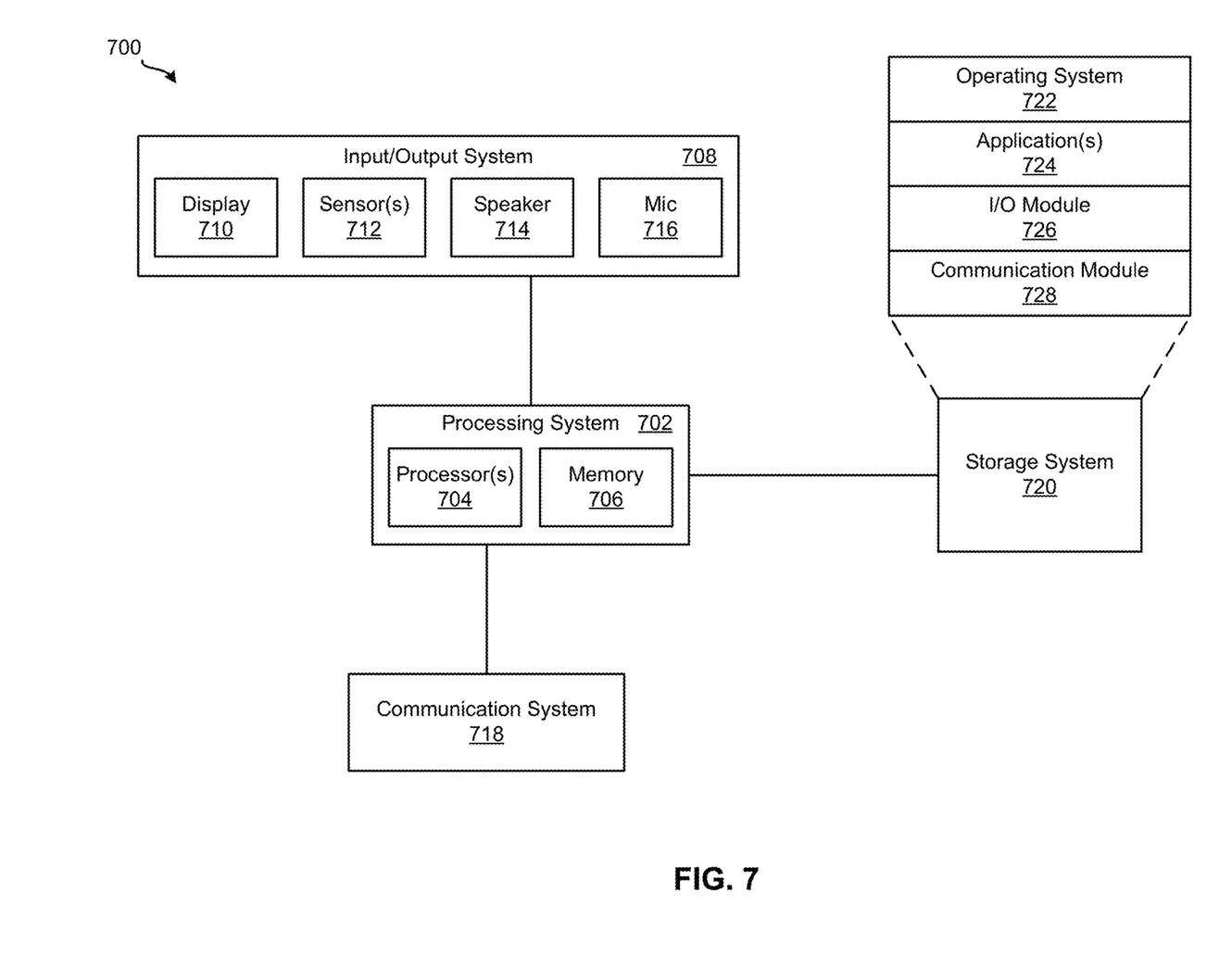
FIG. 7 illustrates an exemplary computing device for implementing various embodiments described above.

FIG. 7 illustrates an exemplary computing device 700 for implementing various embodiments described above. For example, computing device 700 may be used to implement client device 105. Computing device 700 may be a cellphone, a smartphone, a wearable device, an activity tracker or manager, a tablet, a personal digital assistant (PDA), a media player, or any other type of mobile computing device or combination thereof. Computing device 700 can implement many of the operations, methods, and/or processes described above (e.g., process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components and/or processes (e.g., process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Process 500 then receives, at 530, an association between a first attribute in the first data model and a second attribute in the second data model. Referring to FIGS. 1 and 4 as an example, client device 105 may receive an association between the Country attribute of data model 200 and the Country attribute of data model 300 via data model linking tool 415. Next, process 500 receives, at 540, a filter on the first set of data. Referring to FIGS. 1 and 5 as an example, client device 105 may receive a filter on the Country attribute of data model 200 via data filter tool 505.

After receiving the filter, process 500 applies, at 550, the filter to the first visualization. Referring to FIGS. 1 and 5 as an example, client device 105 performs operation 550 by generating a query for Product and Country data from the data model 200 where the value of the Country attribute is Japan or UK and sends the query to database system 125, which returns results for the query that include products P2 and P4 for Japan and products P1, P3, and P4 for the UK. Next, client device 105 updates visualization 405 with the data as shown in FIG. 5.

Finally, process 500 propagates, at 560, the filter to the second visualization based on the association. Referring to FIGS. 1 and 5 as an example, client device 105 performs operation 560 by identifying the values for the Country attribute, which is the attribute specified by the association, in the data from data model 200 with the filter applied. Client device 105 then generates a query for Revenue and Country data from data model 300 where the value of the Country attribute is Japan or UK and sends the query to database system 125. In return, client device 105 receives from database system 125 results for the query that include a revenue of 2.3 M for Japan and a revenue of 1.1 M for UK. Next, client device 105 updates visualization 410 with the data as illustrated in FIG. 5.

Figure 8:
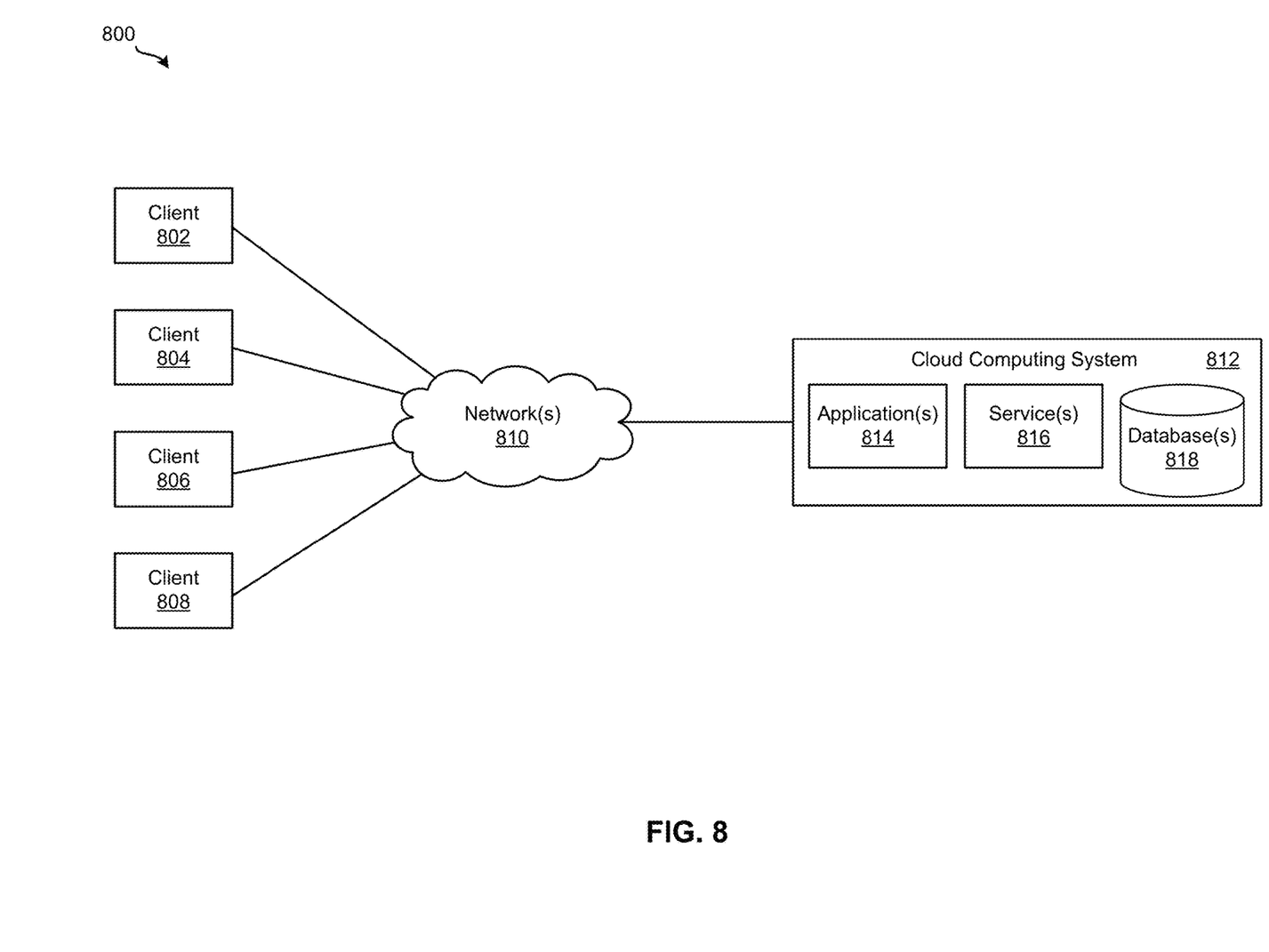
FIG. 8 illustrates an exemplary system for implementing various embodiments described above.

FIG. 8 illustrates an exemplary system 800 for implementing various embodiments described above. For example, cloud computing system 812 of system 800 may be used to implement data modeling system 115 and a client 802-808 of system 800 may be used to implement client device 105. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 130-140 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:
   sending, to a data modeling system, a request for a data model definition of a data model;
   receiving, from the data modeling system, the data model definition of the data model, the data model definition including a mapping between non-spatial data and spatial data, the mapping including a connection attribute and a system attribute;
   generating a query for geo-enriched data from the data model based on the data model definition;
   sending the query to a proxy system using the connection attribute and the system attribute of the mapping, the query for the proxy system to forward the query to a geo-enriched data system; and
   receiving a set of geo-enriched data from the geo-enriched data system via the proxy system.

2. The non-transitory machine-readable medium of claim 1, wherein the program further comprises sets of instructions for:
   accessing a tool for creating data models provided by an application operating on the data modeling system; and
   sending information associated with the data model to the application in order for the application to create and store the data model definition on the data modeling system.

3. The non-transitory machine-readable medium of claim 1, wherein the data model definition of the data model is a first data model definition of a first data model, wherein the query is a first query, wherein the geo-enriched data system is a first geo-enriched data system, wherein the set of geo-enriched data is a first set of geo-enriched data, wherein the program further comprises sets of instructions for:
   receiving from the data modeling system a second data model definition of a second data model;
   generating a second query for geo-enriched data from the second data model based on the second data model definition;
   sending the second query to the proxy system for the proxy system to forward the second query to a second geo-enriched data system; and
   receiving a second set of geo-enriched data from the second geo-enriched data system via the proxy system.

4. The non-transitory machine-readable medium of claim 1, wherein the data model definition comprises a first view of non-spatial data stored in a first set of tables on the geo-enriched data system, a second view of spatial data stored in a second set of tables on the geo-enriched data system, and a mapping between the first view and the second view on the geo-enriched data system.

5. The non-transitory machine-readable medium of claim 4, wherein the non-spatial data stored in the second set of tables on the geo-enriched data system comprises location data, wherein the spatial data stored in the second set of tables on the geo-enriched data system comprises the location data that has been geo-enriched.

6. The non-transitory machine-readable medium of claim 1, wherein the program further comprises a set of instructions for generating a map visualization that includes the set of geo-enriched data.

7. The non-transitory machine-readable medium of claim 1, wherein the geo-enriched data system is a particular geo-enriched data system of a plurality of geo-enriched data systems,
wherein the connection attribute is a name of the particular geo-enriched data system, and
wherein the query for geo-enriched data uses the connection attribute such that the reverse proxy system forwards the query to the particular geo-enriched data system of the plurality of geo-enriched data systems.

8. A method comprising:
sending to a data modeling system a request for a data model definition of a data model;
receiving from the data modeling system the data model definition of the data model, the data model definition including a mapping between non-spatial data and spatial data, the mapping including a connection attribute and a system attribute;
generating a query for geo-enriched data from the data model based on the data model definition;
sending the query to a proxy system using the connection attribute and the system attribute of the mapping, the query for the proxy system to forward the query to a geo-enriched data system; and
receiving a set of geo-enriched data from the geo-enriched data system via the proxy system.

9. The method of claim 8 further comprising:
accessing a tool for creating data models provided by an application operating on the data modeling system; and
sending information associated with the data model to the application in order for the application to create and store the data model definition on the data modeling system.

10. The method of claim 8, wherein the data model definition of the data model is a first data model definition of a first data model, wherein the query is a first query, wherein the geo-enriched data system is a first geo-enriched data system, wherein the set of geo-enriched data is a first set of geo-enriched data, wherein the method further comprises:
receiving from the data modeling system a second data model definition of a second data model;
generating a second query for geo-enriched data from the second data model based on the second data model definition;
sending the second query to the proxy system for the proxy system to forward the second query to a second geo-enriched data system; and
receiving a second set of geo-enriched data from the second geo-enriched data system via the proxy system.

11. The method of claim 8, wherein the data model definition comprises a first view of non-spatial data stored in a first set of tables on the geo-enriched data system, a second view of spatial data stored in a second set of tables on the geo-enriched data system, and a mapping between the first view and the second view on the geo-enriched data system.

12. The method of claim 11, wherein the non-spatial data stored in the second set of tables on the geo-enriched data system comprises location data, wherein the spatial data stored in the second set of tables on the geo-enriched data system comprises the location data that has been geo-enriched.

13. The method of claim 8 further comprising generating a map visualization that includes the set of geo-enriched data.

14. The method of claim 8, wherein the geo-enriched data system is a particular geo-enriched data system of a plurality of geo-enriched data systems,
wherein the connection attribute is a name of the particular geo-enriched data system, and
wherein the query for geo-enriched data uses the connection attribute such that the reverse proxy system forwards the query to the particular geo-enriched data system of the plurality of geo-enriched data systems.

15. A system comprising:
a set of processing units; and
a non-transitory computer-readable medium storing instructions that when executed by at least one processing unit in the set of processing units cause the at least one processing unit to:
send to a data modeling system a request for a data model definition of a data model;
receive from the data modeling system the data model definition of the data model, the data model definition including a mapping between non-spatial data and spatial data, the mapping including a connection attribute and a system attribute;
generate a query for geo-enriched data from the data model based on the data model definition;
send the query to a proxy system using the connection attribute and the system attribute of the mapping, the query for the proxy system to forward the query to a geo-enriched data system; and
receive a set of geo-enriched data from the geo-enriched data system via the proxy system.

16. The system of claim 15, wherein the instructions further cause the at least one processing unit to:
access a tool for creating data models provided by an application operating on the data modeling system; and
send information associated with the data model to the application in order for the application to create and store the data model definition on the data modeling system.

17. The system of claim 15, wherein the data model definition of the data model is a first data model definition of a first data model, wherein the query is a first query, wherein the geo-enriched data system is a first geo-enriched data system, wherein the set of geo-enriched data is a first set of geo-enriched data, wherein the instructions further cause the at least one processing unit to:
receive from the data modeling system a second data model definition of a second data model;
generate a second query for geo-enriched data from the second data model based on the second data model definition;
send the second query to the proxy system for the proxy system to forward the second query to a second geo-enriched data system; and
receive a second set of geo-enriched data from the second geo-enriched data system via the proxy system.

18. The system of claim 15, wherein the data model definition comprises a first view of non-spatial data stored in a first set of tables on the geo-enriched data system, a second view of spatial data stored in a second set of tables on the geo-enriched data system, and a mapping between the first view and the second view on the geo-enriched data system, wherein the non-spatial data stored in the second set of tables on the geo-enriched data system comprises location data, wherein the spatial data stored in the second set of tables on the geo-enriched data system comprises the location data that has been geo-enriched.

19. The system of claim 15, wherein the instructions further cause the at least one processing unit to generate a map visualization that includes the set of geo-enriched data.

20. The system of claim 15, wherein the geo-enriched data system is a particular geo-enriched data system of a plurality of geo-enriched data systems,
   wherein the connection attribute is a name of the particular geo-enriched data system, and
   wherein the query for geo-enriched data uses the connection attribute such that the reverse proxy system forwards the query to the particular geo-enriched data system of the plurality of geo-enriched data systems.

* * * * *